US005740357A

United States Patent [19]
Gardiner et al.

[11] Patent Number: 5,740,357
[45] Date of Patent: Apr. 14, 1998

[54] GENERIC FAULT MANAGEMENT OF A COMPUTER SYSTEM

[75] Inventors: Jeffrey L. Gardiner, Needham, Mass.; Gerhard K. Heider, Valbonne, France; Larry W. Emlich, Colorado Springs, Colo.; Bruce H. Luhrs, Merrimack, N.H.; Michael C. Li, Redmond, Wash.; Michael R. Masters, Castle Rock, Colo.; Russell Lloyd Myers, Grafton, Mass.; Harlo A. Peterson, Colorado Springs; Frank M. Robbins, Momument, both of Colo.; Mark J. Seger, Harvard, Mass.

[73] Assignee: Digital Equipment Corporation, Maynard, Mass.

[21] Appl. No.: 329,800

[22] Filed: Oct. 26, 1994

Related U.S. Application Data

[63] Continuation of Ser. No. 60,884, May 12, 1993, abandoned, which is a continuation of Ser. No. 515,180, Apr. 26, 1990, abandoned.

[51] Int. Cl.⁶ .................................................. G06F 11/30
[52] U.S. Cl. ................................. 395/185.1; 395/200.11
[58] Field of Search ................... 371/7, 8.1, 8.2, 371/9.1, 10.1, 11.1, 11.3, 12, 14, 15.1; 395/185.1, 200.11

[56] References Cited

U.S. PATENT DOCUMENTS

| | | | |
|---|---|---|---|
| 4,085,448 | 4/1978 | Kogge | 395/325 |
| 4,342,084 | 7/1982 | Sager et al. | 395/575 |
| 4,438,494 | 3/1984 | Budde et al. | 395/575 |
| 4,453,213 | 6/1984 | Romagosa | 395/575 |
| 4,468,731 | 8/1984 | Johnson et al. | 395/575 |
| 4,570,261 | 2/1986 | Maher | 371/16.1 |

OTHER PUBLICATIONS

Wakid, S. et al., "Coming to OSI: Network Resource Management and Global Reachability", *Data Communications*, Dec. 1987.

Huntington, J., "OSI-Based Net Management: Is it Too Early or Too Late?", *Data Communications*, Mar. 1989.

Fernandez, J., "SNA and OSI: Which Manages Multivendor Networks Best?", *Data Communications*, Apr. 1989.

Retz, D., "TCP/IP:DOD suite marches into the business world", *Data Communications*, Nov. 1987, pp. 209–225.

Lew, H., et al., "TCP/IP network management with an eye toward OSI", *Data Communications*, Aug. 1989, pp. 123–130.

*Primary Examiner*—Stephan M. Baker
*Attorney, Agent, or Firm*—Diane C. Drozenski; Ronald C. Hudgens; Arthur W. Fisher

[57] ABSTRACT

A method of managing faults in a computer system including the steps of detecting an error, handling the error along a functional hierarchy and, further, handling a fault that caused the error in a management hierarchy which can be operated separately from the functional hierarchy.

8 Claims, 6 Drawing Sheets

GENERIC FAULT MANAGEMENT OF A COMPUTER SYSTEM

This application is a continuation of application Ser. No. 08/060,884, filed May 12, 1993, abandoned, which is a continuation of application Ser. No. 07/515,180 filed Apr. 26, 1990, abandoned.

FIELD OF THE INVENTION

The present invention relates to computer systems, and more specifically, to the managing of faults in a computer system.

BACKGROUND OF THE INVENTION

Fault management is the management of the abnormal operation of a computer system. As is well known, a computer system may comprise many individual components coupled together. Since faults may be thought of as, the underlying cause of abnormal system operation, the purpose of fault management is to return a computer system to normal operation. Therefore, fault management encompasses the entire process of managing faults from their detection to their logical and/or physical removal from the system. Fault management encompasses the handling of faults after they occur, and does not encompass the avoidance of faults.

A system is defined as an interacting set of subsystems that provide a service to a user (or client). The service delivered by the system is the behavior of the system as specified by the user. The subsystems within the system can be further subdivided into additional subsystems, to a desired level of detail.

A system failure occurs when the delivered service (as observed by the user) deviates from the specified service. An error occurs when a portion of the system assumes an undesirable condition. An error observed at the output of the system by the user is considered a failure. A fault is considered to be the underlying cause of an error, although it may or may not be physically identified. Faults may originate from hardware, software, human, or environmental sources. In summary, a fault is the root cause which in turn may result in an error. If the effects of the error are observed by the user of a service, a failure results.

In order for a fault to cause an error, a fault must be both active and stimulated (affecting the service provided by the system). An error must be detected in order to control the results of the service. Undetected errors are not manageable and the integrity of the system may be compromised. Error detection is a necessary prerequisite for error recovery. Error recovery (fault tolerance) ultimately dictates the user response: success if the service was recovered, or failure if the service could not be recovered.

As a fault becomes active and stimulated, it will result in an error. It is possible for a single fault to cause multiple occurrences of an error or multiple error types. Once an error manifests itself, detection of this occurrence depends upon the presence of an error detector. This detection is important since if an error remains latent (undetected), the integrity of the service will be in jeopardy.

Error detection is the act of recognizing a difference between the current, actual behavior of an entity and the expected behavior. The ability to detect errors is a prerequisite to fault management. After detection, the error condition must be communicated to a function that can deal appropriately with (i.e. handle) the error condition. This function is called error handling and is performed by the error handler.

When an error condition is detected, it is most desirable to remove the effect of the error to complete the specified service request. This is the responsibility of the error handler, referred to as error recovery. If error recovery is successful, a success response is returned to the user. Because it determines what service response (success if recovered, or failure if not recovered) must be returned to the user, error handling must be performed synchronously with the respective service.

Conversely, if error recovery was unable to remove the effects of the error, a failure response is returned to the user. The degree of error recovery capability (sometimes referred to as fault tolerance) is implementation specific and outside the scope of this invention.

In summary, error handling is ultimately responsible for processing an error event within the context of a single service request/response. However, even though error handling may remove the effect of an error, it has no bearing whatsoever on the originating fault, since the fault will remain in the system.

Aside from removing the effects of errors from the system, it is also important to remove the source of these errors: the faults. The process of removing faults from a system (which is called fault repair) is the responsibility of the fault handler. Fault handling may be performed asynchronously to the corresponding error handling as it has no impact on the outcome of the error recovery.

To initiate fault handling, the error handler delivers an error information report to the fault handler. The error handler will learn of the error before the fault handler will learn of the underlying fault, since errors are the detectable results of faults. Before the repair can take place, it is imperative that information about the fault is available. The fault handler uses the error information report (possibly along with previous reports) to determine the location of the fault and to initiate repair activity.

It is the purpose of the fault handler to remove the fault from the system, thereby preventing subsequent errors. The repair or removal of a fault may be physical (such as the replacement of a part, or the installation of a software patch), or logical (such as bad page mapping). The repair can be either temporary or permanent.

In prior computer systems, the processes of error detection, error recovery, fault reporting, and fault repair have often been considered to be a single process in handling a fault condition in a computer system. The detection of hardware or software faults were dependent on the mechanisms embedded into a product and were not capable of being modified or manipulated to effect testing and verification of the detection logic itself. Error recovery mechanisms have traditionally been incorporated into products as they become cost-effective to develop or when data integrity has been at risk. The use of modularity for these different concepts has not been widely accepted.

Fault reporting and repair have hitherto been considered part of the operation of a computer system.

SUMMARY OF THE INVENTION

The present invention separates error recovery techniques and fault repair techniques into error handling and fault handling components. The method of managing faults in a computer system according to the present invention includes the steps of detecting an error, handling the error along a functional hierarchy, and handling the fault that caused the error, this fault handling being performed in a management hierarchy that is separate from the functional hierarchy.

The separation of error handling and fault handling components allows effective management of faults within the computer system while minimizing the impact of faults within the components of the computer system.

The separation of error handling and fault handling into different hierarchies allows error handling to be performed synchronously with the functional operation of the system, and the fault handling to be performed asynchronously.

In an embodiment of the invention, a management element is attached to each component in the computer system that provides a service (a service element). The management element includes an error detector that compares the expected behavior of the service element with its actual behavior. If the error detector detects a difference between the expected and the actual behaviors, an error report is sent to an error handler. The error handler attempts error recovery with the service element. Regardless of the success of this error recovery, the error information is passed to a fault handler in the management element. The fault handler will attempt to repair the fault in the service element so that the error will not recur. The error handler and the fault handler in the fault management element can use a tester that will test the service element to gather further information or verify recovery and repair actions executed by the error handler and/or fault handler.

There is communication between the fault management elements and functional elements along the management hierarchy and functional hierarchy so that if an error or fault cannot be handled at a lower level, a higher level fault management element will be able to have the information to attempt recovery and/or repair.

DETAILED DESCRIPTION

Figure 1:
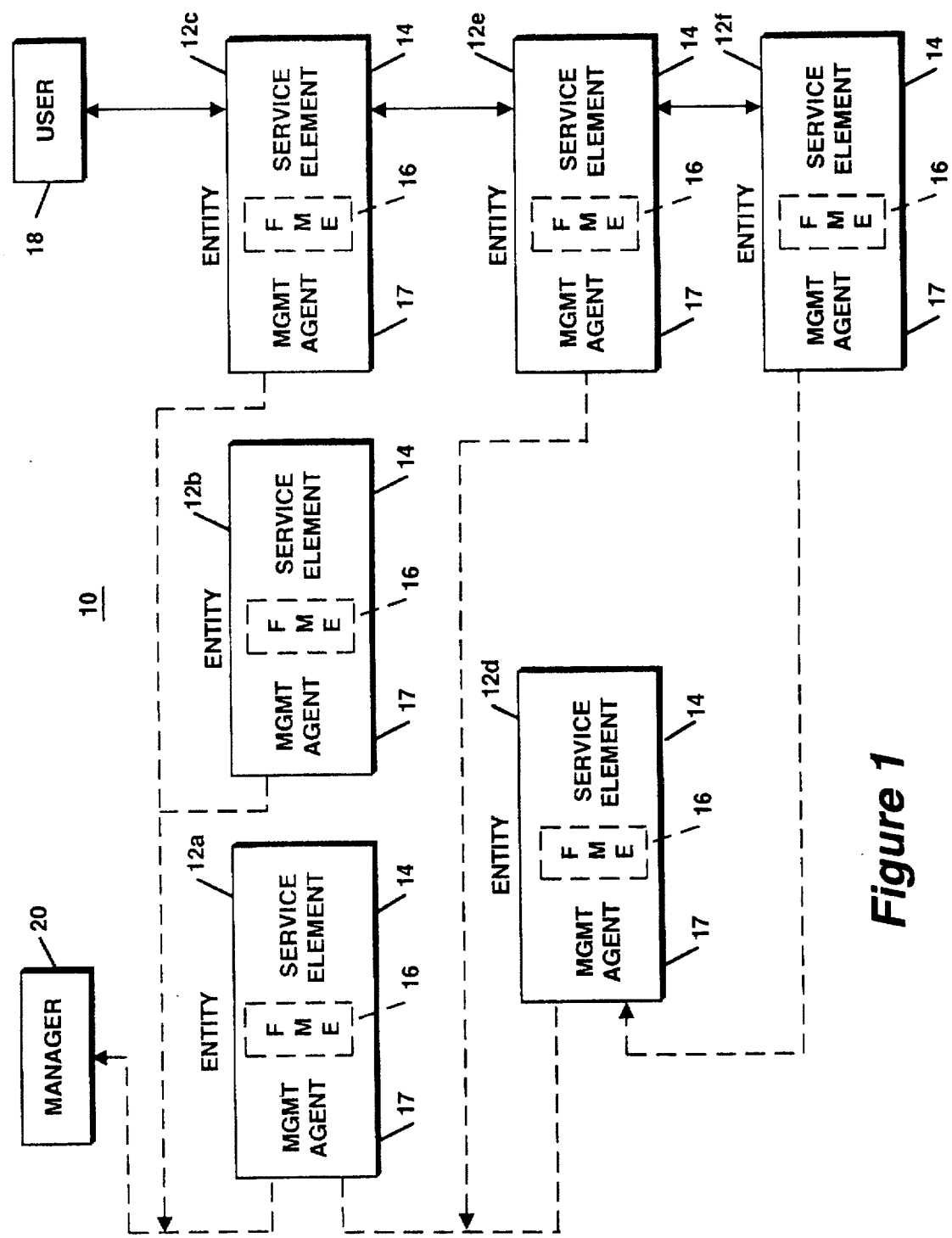
FIG. 1 shows an embodiment of a computer system having a functional hierarchy and a management hierarchy.

FIG. 1 illustrates an example of a computer system 10. The system comprises a number of individual manageable system components, hereinafter referred to as entities 12a–12f. The entities 12f, e, c form a functional hierarchy for a particular service in which higher level entities are considered to be the clients for the services provided by the lower level entities.

Each entity 12a–12f comprises a service element 14, e.g. a disk drive, a CPU, etc. which performs a primary function of the entity, and a management agent 17 that represents the management functionality and the management interface for the entity 12. Each management agent 17 includes a fault management element 16, which will be described in more detail later.

There are two types of hierarchies for the computer system 10, as seen in FIG. 1. The first hierarchy, the functional hierarchy, has already been described. This functional hierarchy is represented by the solid lines between the entities 12c, 12e and 12f. In other words, entity 12c is the client of the services provided by entity 12e, which is the client of the services provided by entity 12f.

The second type of hierarchy is a management hierarchy that is independent of the functional hierarchy. The management hierarchy exists to allow the management of the individual entities 12a–12f. The dashed lines in FIG. 1 represent the couplings of the management agents 17 of the individual service elements 12a–12f. In the management hierarchy, higher level entities manage lower level entities by sending management requests and receiving corresponding responses.

As can be seen in FIG. 1, the functional hierarchy can be different than the management hierarchy. This allows the error detection and handling to follow a different path than the fault handling and repair. In other words, the error handling hierarchy must follow the functional hierarchy (i.e. be synchronous with the service operation) whereas the fault handling hierarchy does not need to follow the functional hierarchy (i.e. is asynchronous with it).

Figure 2:
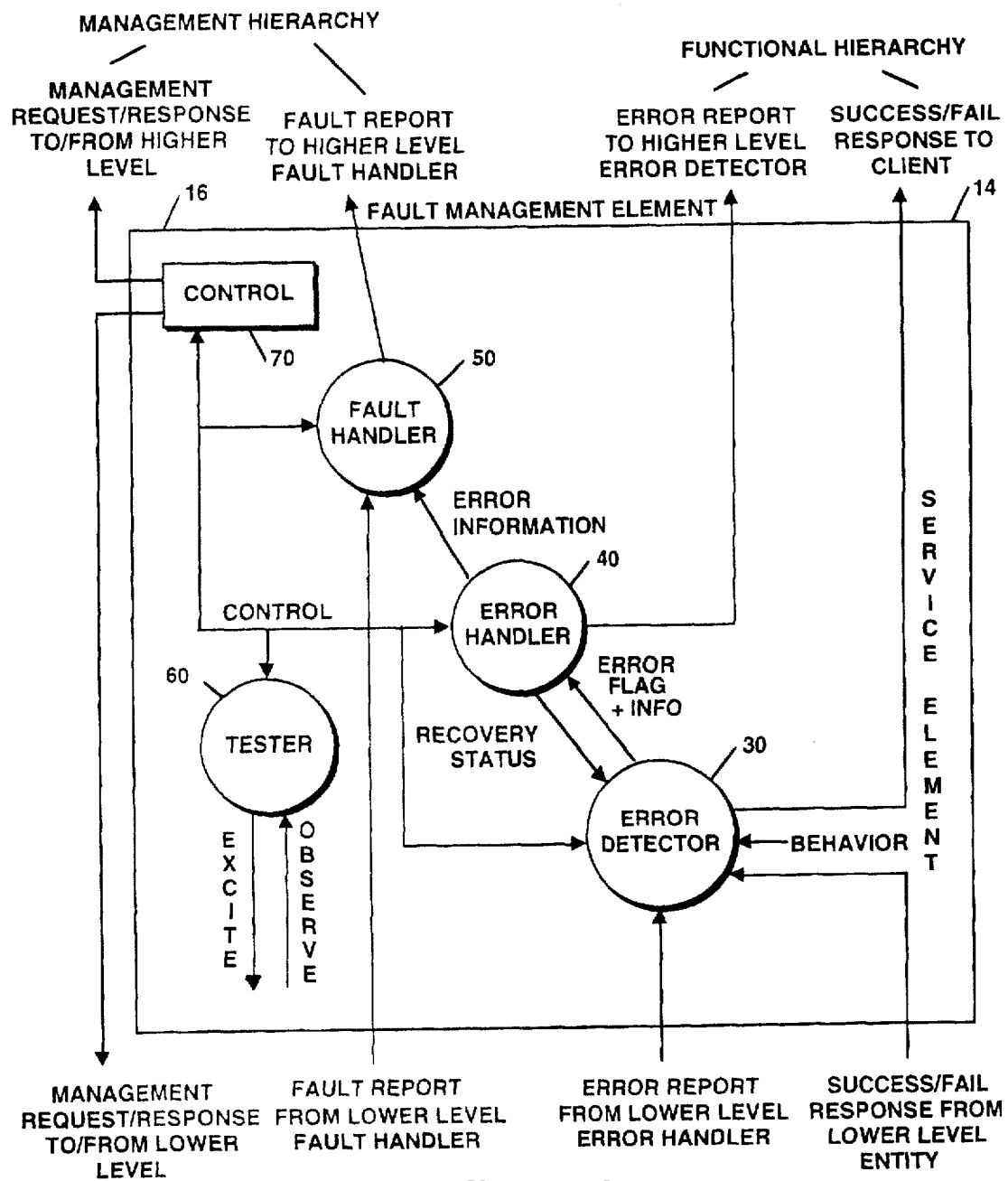
FIG. 2 shows an embodiment of a fault management element.

An example of a fault management element 16 is illustrated in FIG. 2. The fault management element 16 comprises five components—error detector 30, error handler 40, fault handler 50, tester 60, and control 70. The individual components of the fault management element 16 will be described in more detail later with reference to FIGS. 3–6. The functional operation of these components will be described below.

The error detector 30 monitors the behavior of the service element 14 by comparing expected behavior with actual, observed behavior. When a difference (error) is detected, the return of a service response to the client (i.e. the next higher level entity in the functional hierarchy) is delayed until the result of error handling becomes available. Upon the detection of a difference, the error detector 30 notifies and provides corresponding error information to the error handler 40.

The detection behavior of the error detector 30 can be changed by the tester 60 in order to test, enable, disable or change error detection algorithms. Examples of error detectors include parity detectors and cyclic redundancy check (CRC checks) in hardware. In software, error detectors include boundary pages, data structure consistency checks, and time-outs. Syntax checking is done to detect administration errors. Furthermore, temperature or voltage detection checks are performed to detect environmental errors.

The error handler 40 evaluates each error that is passed from the error detector 30 to determine if the error is recoverable. The error handler 40 drives the attempted recovery until it is successful or exhausted. Error information is always provided from the error handler 40 to the fault handler 50, regardless of the success of the attempted recovery.

Error recovery is achieved by either retrying the failed function (in which case the error handler 40 may simply reissue the original client request), or via correction of the error within the error handler 40. The error handler 40 can also use the tester 60 in order to refine the information that is required for successful error recovery. For example, the error handler 40 could cause testing of which bit of a double bit error is solid in order to correct the error.

The error handler 40 returns and responds to the error detector 30 to indicate the success or failure of the recovery attempt (the recovery status). The attempted recovery must be finished before a final response is returned to the user. Hence, error handling is performed synchronously with the service requested by the client.

Examples of error handling include: correction of a single bit in hardware; collection of missing input parameters for a software routine; correction of a syntax error and retry of an operation after a power failure. These are merely examples, and other types of errors can be handled.

The fault handler 50 acts upon error information received from the error handler 40. Fault handler 50 analyzes the error information and attempts to determine the location of the fault, and then initiates the appropriate repair action. In doing so, the fault handler 50 can employ the services of the tester 60 to refine the error information in its attempt to isolate the fault. The repair activities initiated by the fault handler 50 use services available to it for the particular fault under investigation.

Verification of the repair action is also controlled by the fault handler 50. This may be done by using the tester 60 to apply stimuli (excite) and observe the behavior. Another verification method is performed by waiting for a designated period of time in which the same error does not recur. The repair status feedback is required in order to complete the repair activity.

The reversal of previous repair activity may be initiated if it is determined later that the repair was incorrect or incomplete. A temporary repair may also be reversed once a permanent repair plan has been initiated.

Examples of fault handling include bypassing of failed services; fail-over to redundant services; fault diagnosis algorithms to determine failing replaceable services; requesting the physical exchange of a part or upgrading to a new revision/path level etc. by a repair agent.

The tester 60 corresponds to the test capabilities available to the fault management element 16. It can be used by either the error handler 40 or the fault handler 50. It can also be used by higher level entities via the control function. Accordingly, requests are sent by either the error handler 40 or the fault handler 50 and the tester 60 returns corresponding responses. The tester 60 provides various stimuli to the service element 14 for different functions. One stimulus enables/disables or changes the detection algorithms of the error detector 30 as directed by the error handler 40. The result of this action is observed by the error handler 40 through the signals Error Flag and Info sent by the error detector 30, or by the absence of such notification.

Another stimulus checks the error detector by inserting a fault, modifies the detection algorithms, applies stimuli and receives the result directly from the error detector 30. The signal Error Flag and Info to the error handler 40 can be disabled in this situation.

Another stimulus from the tester 60 excites less frequently-used functions by applying the stimuli and observing the result directly at the tester 60. The status is returned to the initiator of the test, either the error handler 40 or the fault handler 50.

Another stimulus applies stress and observes the result directly at the tester 60. Again, the status is returned to the initiator of the test, either the fault handler 50 or the error handler 40.

The control 70 is the part of the management agent 16 which allows higher level fault management elements 16 to control specific, predetermined attributes of the components 30, 40, 50 and 60 in the local level management agent 12.

Therefore, the control 70 interprets management requests, performs the requested function if correctly validated, and provides a corresponding management response. In an embodiment of the present invention, the control 70 also forwards higher level management requests to lower levels. In this embodiment, control 70 also forwards management responses from the lower level to the requesting higher level.

The control 70 allows the error handler 40, the fault handler 50 and the tester 60 at a local level to have access to lower level counterparts. In other words, the control 70 allows communication between fault handlers 50 and error handlers 40 within a management agent 16, or between separate management agents 16 on different levels.

Since error handling entails removing the effects of errors in order to provide correct service, error handling must co-exist within the functional hierarchy, indicated by the solid lines in FIG. 1. Therefore, the error handling hierarchy is the same as the functional hierarchy. A success/fail response is used to synchronize error detection and error handling within the functional hierarchy. The error report interface is used to provide information necessary for error handling from one level to another level. If an error is not detected at a particular level, the error detector 30 passes the success response on to the next level. If a fail response is received from a lower level, or if an error is detected at the local level, the response to the next higher level is delayed until error handling is complete.

There are three possible scenarios of error detection handling and error reporting. First, the error can be detected at the local level, in which case the error handler 40 will attempt recovery as described above. Second, there can be a failure in a lower level with the associated error report being received from the lower level together with the fail response. In this case, enough information may be provided in the error report to allow recovery at this level. Additional information may be gathered from the lower level error handler 40 via the control 70. The third possibility is for a fail response without an associated error report being received from the lower level. In this case, the error handler 40 may use a management request/response exchange via the control 70 to gather more information from a lower level error handler 40. If the recovery is successful, a success response is sent to the next higher level. If the recovery is not successful, a fail response and error report (if applicable) is sent to the next higher level.

Error information will be sent to the local level fault handler 50 to allow repair activity to be evaluated within the fault handling hierarchy.

As can be seen in FIG. 1, the management/fault handling hierarchy does not necessarily follow the functional hierarchy. Also, a fault handler 50 may send a fault report to higher level fault handlers 50. Fault handling at a particular level begins when the fault handler 50 receives an error information report from the error handler 40 at the local level, or when the fault handler 50 receives a fault report from a lower level fault handler 50. The fault handler 50 then attempts to determine the required repair activity as described earlier. The control 70 can be used by a local level fault handler 50 and the resulting management request/ response to request further information from a lower level fault handler 50. The local level fault handler 50 may use the tester 60 of lower levels to refine the fault information. Further, the fault handler 50 may attempt or request repair by sending a fault report to the next higher level. Fault handler 50 can verify a repair, by using tester 60 at the local or lower levels.

The fault reports are sent up the management hierarchy. Thresholds (not shown) can be used to prevent each report from being passed up, and cause a fault report to be passed further up the management hierarchy only when the same fault has been reported a predetermined number of times.

The error detector 30, the error handler 40, the fault handler 50, and the tester 60 have all been described generally with reference with FIG. 2. A more detailed description of each of these components is provided below with reference to FIGS. 3–6.

Figure 3:
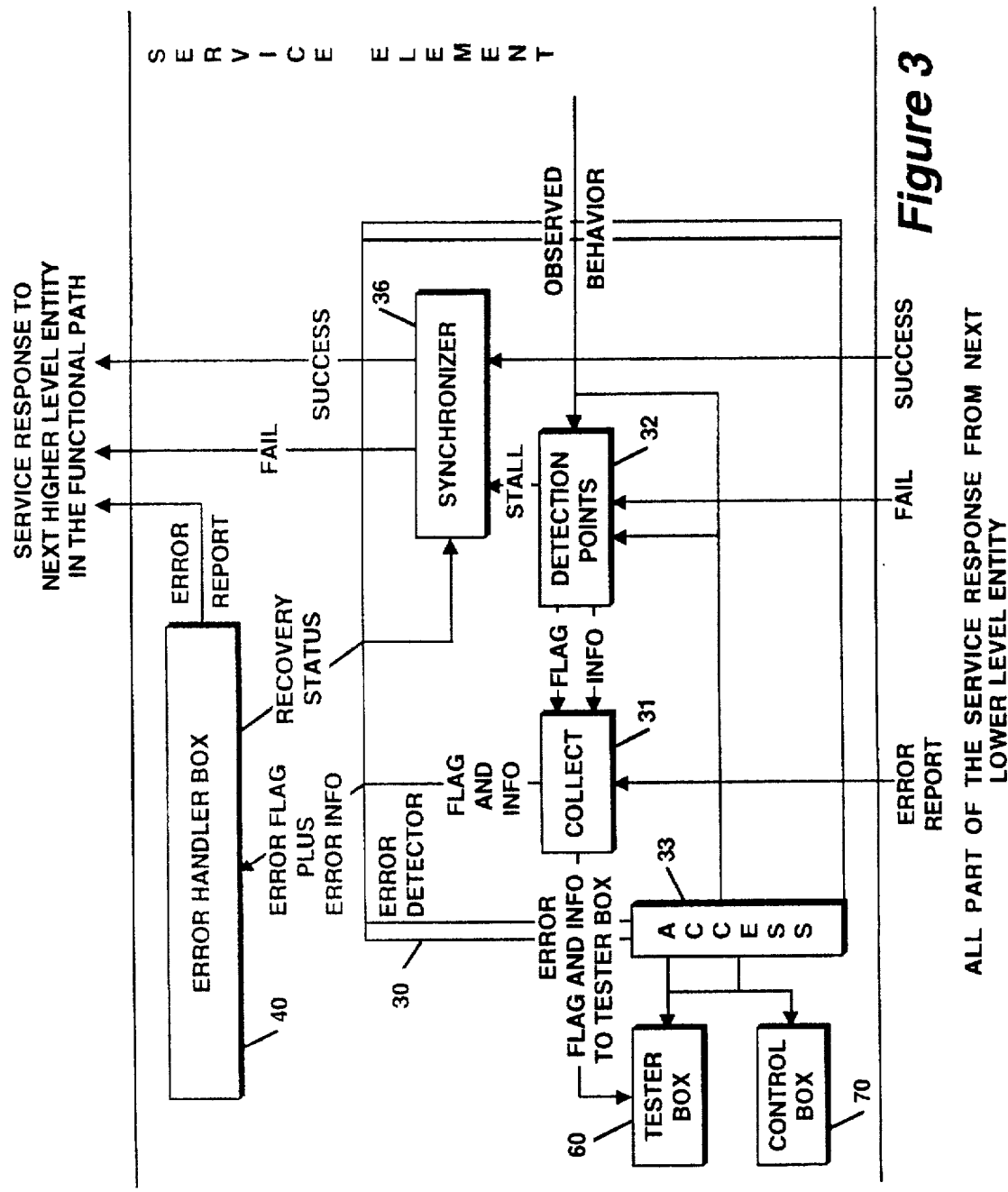
FIG. 3 illustrates in greater detail the error detector used in the embodiment of the management agent of FIG. 2 constructed in accordance with an embodiment of the present invention.

The error detector 30 is shown in more detail in FIG. 3. As stated earlier, the error detector 30 monitors the behavior of the service element 14 by comparing its expected behavior to its actual behavior. The error detector 30 notifies and provides corresponding error information to the error handler 40 upon detection of a difference. The error detector 30 is the conceptual location of one or more detection points of a given entity 12. Each entity 12 defines the relationship between detection points and components of the error detector 30. For example, an entity can have many detection points and as many error detectors 30.

Upon receiving a success response from a lower level entity, the error detector 30 merely passes the success response to a synchronizer 36. After the synchronizer receives the success response and if an error is not detected at the local level, the success response is provided from the synchronizer 36 to the next higher level entity in the functional hierarchy.

When the actual behavior of the service element 14 of the entity 12 differs from its expected behavior, the detection points 32 inhibit the return of a service response until activity at this local level is complete. A failed service response received from the lower level entity in the functional hierarchy will result in the same inhibition.

Error information (the error report) is collected by the collector 31 in conjunction with the detection of unexpected behavior or a fail response. This error report may originate locally, or may be contained within an error report received synchronously with the fail response from the lower level entity. The collector 31 provides an error flag and error information (Error Fag and Info) to the error handler 40. If recovery is successful, the error handler 40 unstalls the stalled service response, and returns a success response to the next higher level entity by providing the recovery status to the synchronizer 36. If recovery was not possible, the recovery status provided to the synchronizer 36 causes a failed response to be sent to the next higher level entity. Synchronously with this fail response, the error handler 40 may send an error report containing additional error information to the next higher level entity.

The tester 60 can modify the detection points 32 or observe behavior to verify that the detection points 32 are functioning properly. The tester 60 can also request that the Error Flag and Info from the collector 31 be sent to the tester 60. The control 70 can also read or modify the detection points 32 via the access function 33.

Figure 4:
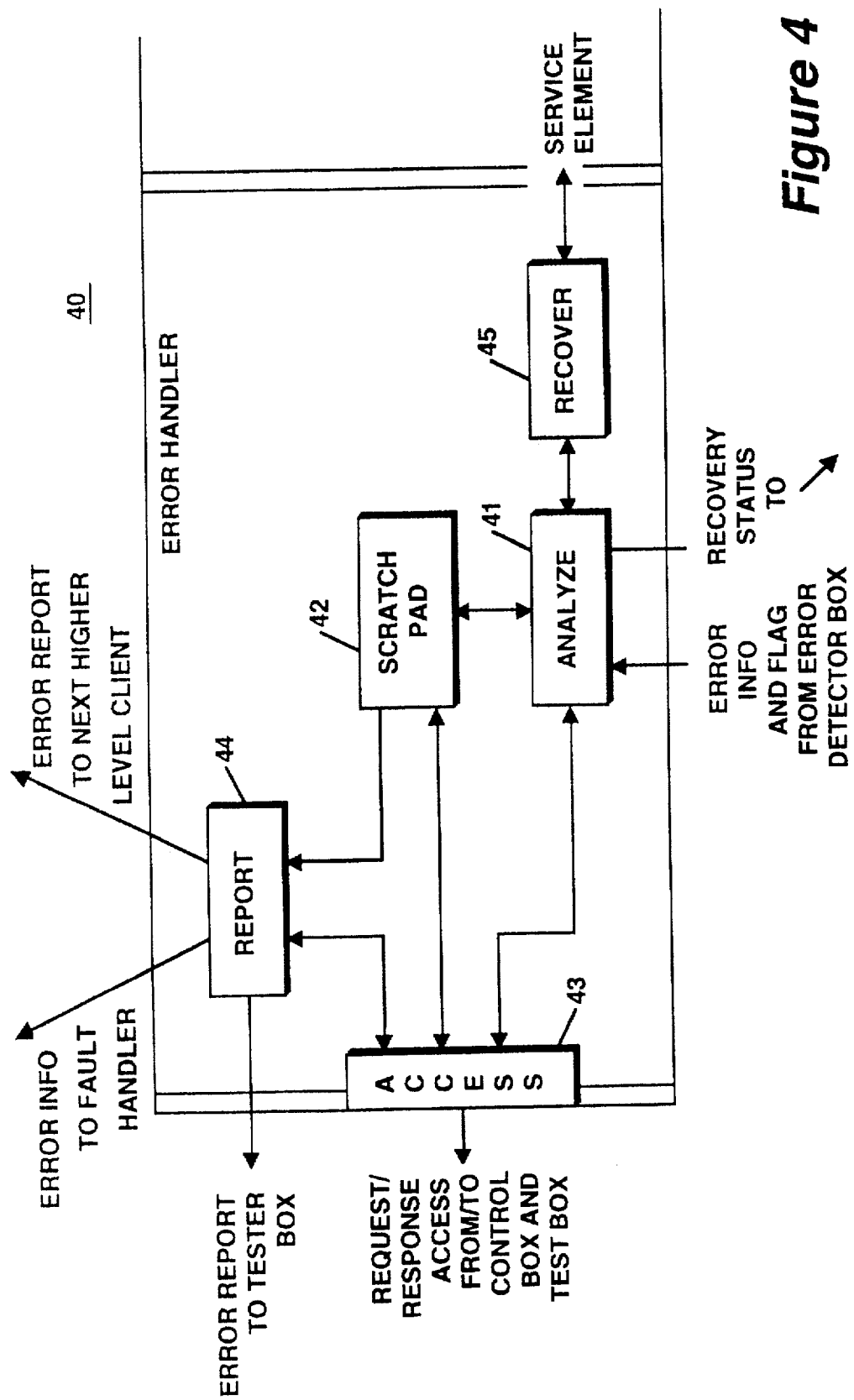
FIG. 4 illustrates in more detail an error handler used in the management agent of FIG. 2 constructed in accordance with an embodiment of the present invention.

The error handler 40 is shown in greater detail in FIG. 4. As stated earlier, the error handler 40 attempts recovery from an error. The error handler 40 evaluates every error detected by the error detector 30 for recoverability. The error handler 40 drives the attempted error recovery until it is either successful or exhausted. The error handler 40 returns status information to the error detector 30 and passes information to the fault handler 50 and to the higher level error detector 30, if appropriate.

As seen in FIG. 4, an analyze function 41 controls the error handler 40. The analyze function 41 executes a plan of action for a specific error that is reported by the error detector 30. Depending upon the error, the error handler 40 performs certain steps. Activity starts in the error handler 40 when an Error Flag and Info is received from the error detector 30. The plan of action is selected based upon the error symptom indicated by the Error Flag and Info. More information can be collected from the local level entity 12 or from a lower level entity 12 via an access function 43. The access function 43 provides a request/response access to and from the control 70 and the tester 60.

The tester 60 may be used by the error handler 40 to refine the information available for error recovery. Using a recover function 45, a specific recovery operation may be requested to the local level service element 14. The corresponding response will indicate success or failure of the recovery operation. If the error was detected at the local level, the analyze function 41 generates the required error information and incorporates it into any corresponding error report. If the error was detected by a lower level entity and reported to this local level by an error report, the local level error handler 40 adds an entity identification (i.d.) plus any additional information to a corresponding error report that it generates.

Success or failure of a recovery attempt by the recover function 45 is reported back to the error detector 30. Unsuccessful recovery will cause the analyze function 41 to pass error information on to the next higher level entity in an error report through a reporting function 44. The error report is synchronized with the corresponding fail response which travels up the functional path to the next higher level entity. The error information at the local level will be passed to the fault handler 50 regardless of recovery success or failure. The recover function 45 performs and controls specific recovery operations. One method of recovery retries the failed operation. In this case, the recover function 45 becomes the client of the corresponding functional path. It is therefore the service client and receives a service response. If the service response returned to the recover function 45 indicates success, the retry operation was successful, and the original client service request (which was stalled because of the error) can be continued. The recover function 45 returns the success indicator to the analyze function 41 as a response to the recovery operation request. The analyze function 41 in return returns a success recovery status to the error detector 30, which enables unstalling of the service response to the higher level entity.

If the recovery attempt was unsuccessful, an unsuccessful service response is returned to the recover function 45. This unsuccessful service response is passed along to the analyzer function 41. The analyzer function 41 can attempt more retrys or other types of recovery operations. If the error cannot be recovered, the analyzer function 41 returns a failed recovery status to the error detector 30 which will then send a failed response to the higher level entity. The error handler 50 can also send an error report to the client.

In addition to the analyzer function 41 having access to lower level entities, the access function 43 allows management of the local level error handler 40 by a higher level entity 12. Some of this management of the local level error handler 40 includes reading and writing of a scratch pad function 42 that serves as temporary storage of error, state, and status information; access to and control of analyzer function 41 attributes, such as counters and error handling thresholds; switching the reporting function 44 to report to the tester 60 instead of to the fault handler 50, or to the next higher level entity; and for diagnostic purposes, the higher level entity 12 may change the reporting function 44 to report only to the tester 60 via the access function 43.

The reporting function 44 is controlled by the analyzer function 41, which provides the error information and directs the sending of this information. The reporting function 44 sends error information to the local level fault handler 50, and if recovery was unsuccessful, it may send an error report to the next higher level entity.

Figure 5:
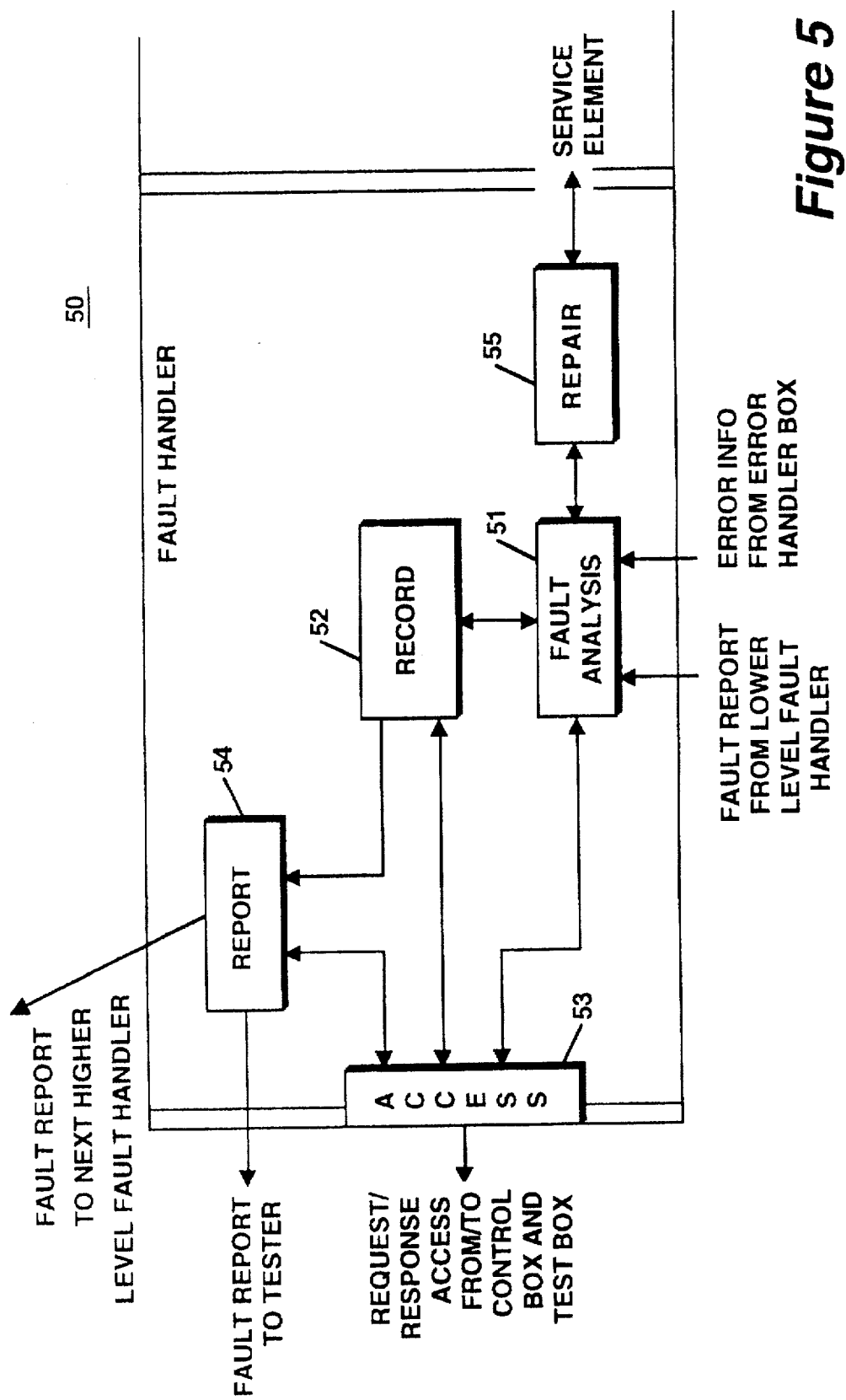
FIG. 5 illustrates a fault handler used in the management agent of FIG. 2 constructed in accordance with an embodiment of the present invention.

As discussed earlier, fault handling is the process that attempts to temporarily or permanently remove a fault from the system. Fault handling proceeds even if the error is recovered by error handling, because even a fully-tolerated fault should be removed for performance reasons to prevent repetition of error recovery, and to maintain a high level of fault tolerance. An embodiment of the fault handler 50 is shown in FIG. 5. A fault analysis function 51 controls the fault handler 50. It receives the fault reports from lower level fault handlers 50, and Error Info from the error handler 40 at this level.

Depending upon the specific fault, certain steps are performed by the fault handler 50. Activity starts when error information is received from the error handler 40 or a fault report from a lower level fault handler 50. A plan of action for fault handling is then selected based upon the specific error that has been reported. The plan of action controls analysis of the information received, with the goal of the plan being to isolate the fault and select and initiate a repair action. More information can be collected from the error handlers 40 at the local level or from a lower level via an access function 53. The tester 60 can be used to refine the information available for repair by running diagnostics. The access function 53 is again used to accomplish this task.

If repair at the local level is possible, a specific repair action may be requested from a repair function 55. The corresponding response from the repair function 55 indicates the success or failure of the repair action. When the repair action resulted in the decision to request the involvement of a service agent (i.e. human intervention) a Service Already Initiated Flag is set in the fault report if the request for the service agent has already been made. If a higher level fault handler 50 is required to request the involvement of a service agent, the Initiate Service Required Flag is set in the fault report. Verification of the repair action is also controlled by the fault analysis function 51. This could be done by using the tester 60 to apply stimuli and observe the behavior, or by waiting for a designated time in which the same error does not recur. The reversal of previous repair activity may be initiated if it is determined later that the repair is based on a premature or incomplete diagnosis or to implement a permanent repair after a temporary repair had been instituted.

The repair function 55 controls repair action by using services made available for the particular fault under investigation. The services include, among others, configuration management to bypass failed parts, failover to redundant parts, and fault recovery mechanisms such as mapping bad disk blocks or memory pages. The repair function may also request the physical exchange of a part or an upgrade to a new revision by a service agent.

The required repair action as determined by the fault analysis 51 function can differ for every individual product and every individual error. Therefore, individual algorithms must be defined for each product and error. Repair analysis is well-known to those of ordinary skill in the art. Specific fault analysis algorithms are well-known to those of ordinary skill in the art of product repair.

Classification of repair actions can be simplified by the accurate definition of repair levels, which in turn facilitates the corresponding analysis by higher level fault handler 50. One definition of a repair action is no repair in which the fault cannot be isolated and removed or that a repair is not needed. A second definition of a repair action is temporary repair, where the fault may have been removed and service upgraded, so that further repair action is required. A third definition of a repair action is permanent repair, in which the fault has been removed logically or physically and no further repair action is required.

Where there is no repair, (i.e. the fault cannot be isolated and removed or not needed) the fault handler 50 may abandon attempts to repair the fault. In this case, the fault handler 50 reports any repair actions to the next highest level fault handler 50 along with the results of those actions. This procedure allows the higher level fault handler 50 to continue the attempted repair.

The repair process involves several functions of the fault handler 50. The report function 54 sends fault reports to higher level fault handlers 50, as directed by them. The access function 53 permits the local level fault handler 50 to obtain access to report filters of lower level fault handler 50 and their record functions 52. The access function 53 also allows a higher level fault handler 50 to control the setting of the local level's report filters and access to its record function 52.

The record function 52 serves as the memory for the fault analysis and the repair functions. The record function 52 contains all the available information for any repair activity in progress at this local level. Once a fault is repaired, the repair actions are made available for storage by the analyze function 51.

Figure 6:
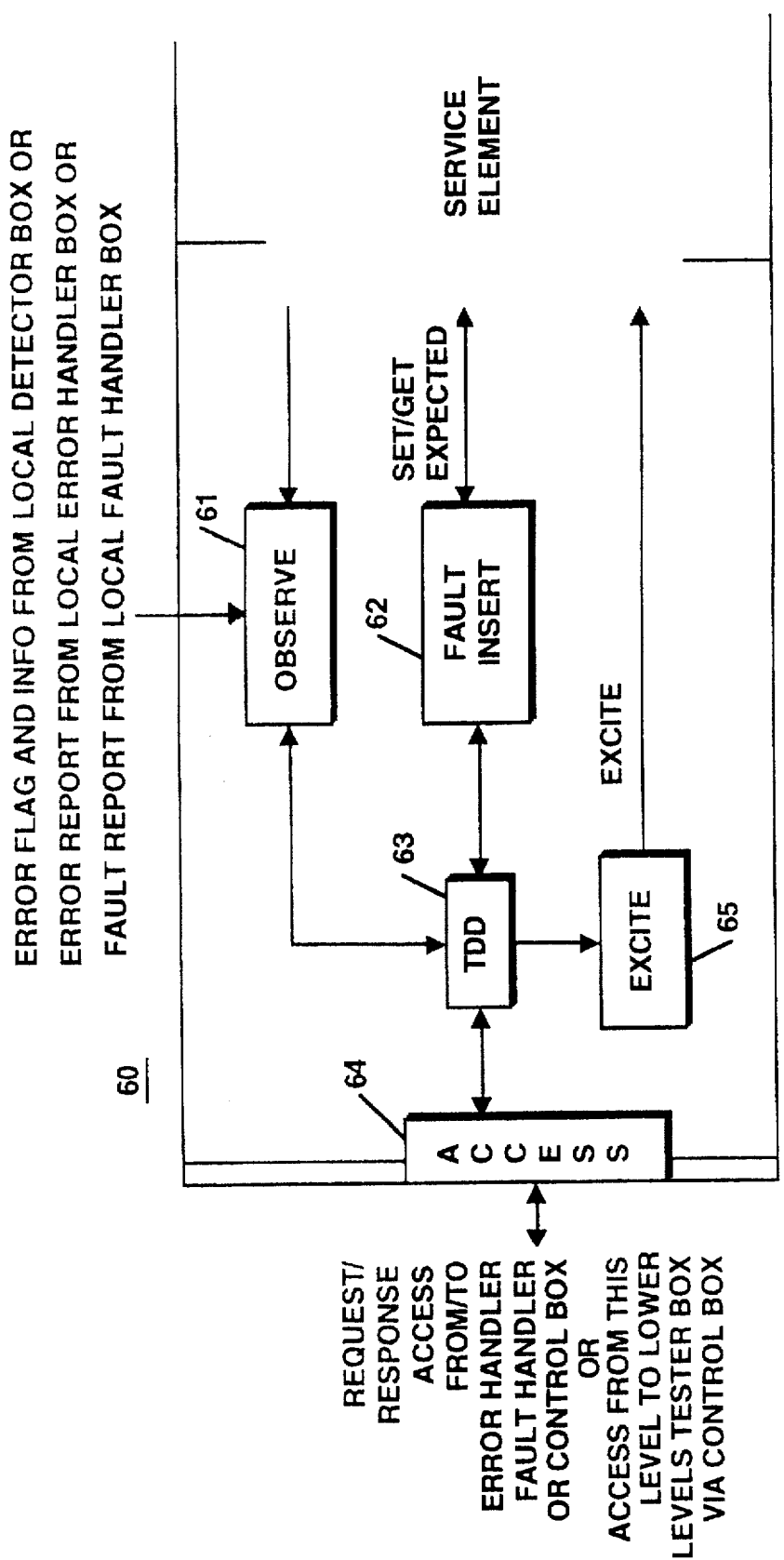
FIG. 6 shows in more detail a tester used in the management agent of FIG. 2 constructed in accordance with an embodiment of the present invention.

A more detailed diagram of tester 60 is shown in FIG. 6. A specific diagnostic for the specific service element of entity 12 is represented by the test directed diagnosis 63 (TDD). The TDD 63 accomplishes its task by one of a number of different methods. One method uses the normal functions of the service element by using available on-line diagnostics. Another method uses the TDD function 63 of the local level entity 12; another uses the TDD functions of lower level entities; and another uses fault insertion.

Different test strategies may be provided by the tester 60. One strategy is the test directed diagnosis in which less frequently used functions, and diagnostic functions of the entity, are excited via an excite function 65. The results are observed directly by an observe function 61. An access function 64 is used to return the corresponding status to the initiator of the test.

Another test strategy is stress testing. In this strategy, normal functions are excited at maximum rate and/or over extended periods of time to stress-test the entity 12. The results are observed by the observe function 61. The access function 64 returns the status to the initiator of the test.

A third test strategy is the fault insertion strategy, which is performed by modifying the detection points 32 of the error detector 30. This is done by using the fault insert function 62 of the tester 60. In an operation, the service element is excited and will cause the error detector 30 to detect an error. Error flag and error data are reported directly to the observe function 61 of the tester 60 by the collect function 31 in the error detector 30. This allows verification of the error detecting signaling mechanism and the detected symptom information. The error flag and error data are reported to the error handler 40. This can be the result of a test initiated by the error handler 50 (for example, which bit of a double bit error is the solid bad bit). The corresponding test would be complete in this case, as the initiator of the corresponding TDD function 63 had received the corresponding response. The test can also be controlled by the TDD function 63, which would have changed the report function in the error handler 40 to send the error report to the observe function 61 in the tester 60. This allows testing of the error detector 30 and the error handler 40.

Error flag and error data are reported to the fault handler 50. This can be the result of the test initiated by the fault handler 50, for example, to verify a repair action. The corresponding test would be complete in this case, as the initiator of the corresponding TDD function 63 had received the corresponding response. The test could also be controlled by the TDD function 63, which would have changed the report function in the fault handler 50 to report the fault report to the observe function 61 in the tester component. This allows testing of the error detector 30, error handler 40 and fault handler 50.

There are certain rules that ensure that the management of faults using the embodiments described above is possible. These include rules for error reporting, and fault reporting, and are described in more detail below.

With regard to error reporting, error handling is attempted over multiple levels up to the highest level entity in the functional hierarchy. Error handling takes place until recovery is successful or recovery possibilities are exhausted. If the error was recovered, a success response is reported to the client. The error report stops at the level where the error is recovered. If the error could not be recovered, the corresponding fail response, plus possibly an error report, reaches the client.

An error handler 40 at the local level has no knowledge whether the error handler 40 in the next higher level will be able to recover from an error. Therefore, the error handler 40 cannot determine whether the error will be recovered by the higher level. Thus, the error reporting rule is that an error handler which detects an error places all error information which may be required for error recovery at a higher level into the error report, or stores it at the local level. The error handler must report every error, whether recovered or unrecovered, to the fault handler at the local level. This report should contain all the information which may be required for fault isolation and repair in order to make fault handling possible.

Certain non-successful responses (errors) to the client can be caused by invalid client service requests. Fault reports are not normally generated to travel along the fault handling hierarchy for such errors. If such an error is reported to a fault handler 50, the complete information required for fault handling is made available.

The following is a discussion of the rules for fault reporting. Higher level management relies on management information from all lower levels for which it has been assigned the manager. For example, the highest level management, the network manager, must know about all of the entities coupled to the network to properly manage the network.

The management hierarchy is set up by the network manager and it remains in effect until changed by management request. The fault reporting path, which follows the management hierarchy, is static and may be different from the path used for error reports. The fault reporting path is always the same for a given entity until it is changed by management.

It is important to realize that a single fault may cause repeated error reports. This can happen when the corresponding error is recovered for multiple client service requests, or when multiple client service requests failed due to an unrecoverable error. Furthermore, multiple fault reports may be created from a single error. This condition is a result of the requirement that individual error handlers report every error to the corresponding level fault handler. Multiple levels of unsuccessful error handling could also produce multiple fault reports. Therefore, individual fault reports may not carry the complete information required to perform complete analysis of error impact or required repair activity. This situation occurs for a number of reasons.

One of the reasons is that fault handling does not occur synchronously with a client service request, but may be performed later (i.e. asynchronously). There are no guarantees that fault reports are delivered in their sequence of occurrence. Since fault reporting may be restricted by the setting of the fault handler report filters, there is no guarantee that all fault reports generated due to a single error are reported. Therefore, one fault information rule is that the fault handler 50 can be capable of preserving all error information received from the error handler 40 that may be required for fault repair.

Since error handling at higher levels may recover the error, fault reports from lower level fault handlers 50 may not carry the complete information relating to the fault. Therefore, another rule is that the fault handler 50 generates fault reports for all errors which are unrecoverable at the corresponding level.

Management domains may be crossed by a single client service request or response. If an error occurs on such a request, the corresponding error report will also cross those domains. However, fault reports will follow the fault handling hierarchy within the respective domains only and the corresponding service response, which may be an error report. Fault reports are restricted to a domain while error reports are not. Accordingly, fault reports from a low level entity may travel up a different management path than successive fault reports from higher level entities involved in the specific client service request. This leads to the rule that fault handling across management domains requires fault handlers which are visible across the corresponding domains.

Overall, the fault handling typically involves multiple fault handling levels. In such a hierarchy, an error considered fatal to one level may not be of interest to a higher level. For example, a fatal disk problem may cause activity in the fault handler responsible for disk errors, yet may not be of concern to the fault handler at the next highest level. The following potential problems exist for such distributed responsibility for fault handling. A lower level fault handler that determines that higher level repair involvement is required may need to report this via the normal fault reporting path, yet the higher level fault handler may not recognize the receipt of the fault report nor act upon it. Another problem is that the lower level fault handler that determines that repair action is required may need to report this via the normal fault report path, yet the higher level fault handler 50 may not recognize the received fault report nor act upon it. Another potential problem is that the lower level fault handler 50 that determines that repair action is required may want to allow a higher level fault handler 50 to add value. However, there is no simple way for the lower level fault handler 50 to assure that the higher level fault handler 50 does not perform the value-adding service. A third potential problem is that the lower level fault handler 50 may have access to a path to initiate repair. The corresponding fault report that flows up to higher levels of fault management could trigger another request for repair from those higher level, which would be redundant.

To solve these problems, fault reports can include a field that carries an Initiate Repair Flag and one that carries a Repair Already Initiated Flag.

The above describes an embodiment of rules that ensure proper operation of the present invention, although other rules could also be used, the rules described above not being all-inclusive.

What is claimed:

1. A method of managing faults in a plurality of entities of a computer system, comprising the steps of:

providing a functional hierarchy for performing error detection and error handling, said functional hierarchy including a plurality of levels wherein higher level entities are clients for services of lower level entities;

providing a management hierarchy for performing fault handling, said management hierarchy including a plurality of levels wherein higher level entities manage lower level entities;

operating said functional hierarchy to detect and handle each error occurring during operation of the computer system, including forwarding information regarding each error to said management hierarchy;

operating said management hierarchy separately from said functional hierarchy to handle a fault that caused said error including the step of refining, at said management hierarchy, said information received from said functional hierarchy to isolate said fault; and controlling communication between entities on one hierarchical level and entities on a higher hierarchical level or between entities on one hierarchical level and entities on a lower hierarchical level by decentralized control means located within each of said entities.

2. The method of claim 1, wherein the step of operating said functional hierarchy includes the step of reporting detection of said error to a fault handler that performs said fault handling.

3. The method of claim 2, wherein the step of operating said functional hierarchy includes the step of comparing in an error detector expected behavior of a service element with the actual behavior of the service element and reporting an error to an error handler when there is a difference between the expected behavior and the actual behavior.

4. The method of claim 3, further comprising the step of testing the service element with signals from a tester.

5. The method of claim 4, wherein the step of controlling communication includes reporting said error at a local level to an error detector of a higher level in the functional hierarchy when the error is not recoverable by the error handler at the local level.

6. The method of claim 5, wherein the step of controlling communication includes receiving error information originating at a lower level in the management hierarchy.

7. The method of claim 6, wherein the step of controlling communication includes the step of controlling a lower level fault handler and tester to handle a fault located at the lower level in the management hierarchy.

8. The method of claim 1, wherein the step of operating said functional hierarchy is performed synchronously with a functional operation of the computer system and the step of operating said management hierarchy is performed asynchronously from the functional operation of the computer system.

* * * * *